(12) United States Patent
Ranz et al.

(10) Patent No.: US 9,436,349 B2
(45) Date of Patent: Sep. 6, 2016

(54) BUSINESS SOLUTION USER INTERFACE ENABLING INTERACTION WITH REPORTS

(71) Applicant: Microsoft Corporation, Redmond, WA (US)

(72) Inventors: Jennifer Ranz, Fargo, ND (US); Brian Meier, Fargo, ND (US); Robert Wagner, Fargo, ND (US); Robert Bernhardt, Fargo, ND (US); John Nannenga, Fargo, ND (US); Yury Mikheev, Fargo, ND (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 671 days.

(21) Appl. No.: 13/796,805

(22) Filed: Mar. 12, 2013

(65) Prior Publication Data

US 2014/0282261 A1  Sep. 18, 2014

(51) Int. Cl.
*G06F 3/048* (2013.01)
*G06F 3/0482* (2013.01)

(52) U.S. Cl.
CPC .................................. *G06F 3/0482* (2013.01)

(58) Field of Classification Search
CPC ............ G06F 3/00; G06F 3/01; G06F 3/017; G06F 3/041; G06F 3/048; G06F 3/0481; G06F 3/0482; G06F 3/0484; G06F 3/0488
See application file for complete search history.

(56) References Cited

U.S. PATENT DOCUMENTS

| 7,594,193 | B2 * | 9/2009 | Thomas | G06F 17/30867 715/738 |
|---|---|---|---|---|
| 7,949,619 | B2 | 5/2011 | Narayanaswamy et al. | |
| 7,958,459 | B1 * | 6/2011 | Mahmood | G06Q 10/00 715/808 |
| 7,992,104 | B2 * | 8/2011 | Weir | G06F 3/0481 345/440 |
| 8,271,898 | B1 * | 9/2012 | Mattos | G06F 3/0485 345/473 |
| 8,566,711 | B1 * | 10/2013 | Srivastava | G06F 17/2288 715/243 |
| 9,141,275 | B2 * | 9/2015 | Brown | G06F 3/04817 |
| 2002/0073114 | A1 * | 6/2002 | Nicastro | G06Q 10/06 705/36 R |
| 2005/0197845 | A1 | 9/2005 | Wachter et al. | |
| 2006/0212833 | A1 * | 9/2006 | Gallagher | G06T 11/206 715/848 |
| 2007/0061324 | A1 * | 3/2007 | Morris | H04N 1/00132 |
| 2011/0321159 | A1 * | 12/2011 | Nestler | G06F 21/6218 726/21 |
| 2013/0173649 | A1 * | 7/2013 | Chmiel | G06Q 10/06 707/765 |

(Continued)

OTHER PUBLICATIONS

Leblond, Antoine., "Deploying Metro style apps to businesses", Retrieved at <<http://blogs.msdn.com/b/windowsstore/archive/2012/04/25/deploying-metro-style-apps-to-businesses.aspx>>, Apr. 26, 2012, pp. 8.

(Continued)

*Primary Examiner* — Xiomar L Bautista
(74) *Attorney, Agent, or Firm* — Thomas Marquis; Jim Ross; Micky Minhas (57) ABSTRACT

Technologies are generally described for providing an interactive user interface for enabling users to interact with reports and other documents associated with an entity on various client devices and to effectively manage business activities from their client device. The business application user interface may enable a user to access work documents on a client device over a network, and to interact with the documents on the client device. The user interface may display reduced thumbnail versions of available reports, select and view them based on one or more roles. The user interface may adapt how a report is displayed in a full size based on the type of device on which the user views the report.

9 Claims, 10 Drawing Sheets

(56) References Cited

U.S. PATENT DOCUMENTS

2013/0212485 A1* 8/2013 Yankovich ............ G06F 9/4451
715/741
2014/0181708 A1* 6/2014 Kikin-Gil ............. G06F 3/0482
715/765

OTHER PUBLICATIONS

Lucas, "Microsoft Dynamics GP Business Analyzer: Part 1", Retrieved at http://community.dynamics.com/product/gp/gptechnical/b/dynamicsgp/archive/2012/04/26/microsoft-dynamics-gp-business-analyzer-part-1.aspx>>, Apr. 26. 2012, pp. 5.

Purdy, Sarah., "Microsoft Dynamics GP Business Anaiyzer: Part 2", Retrieved at <<http://community.dynamics.com/product/gp/gptechnical/b/dynamicsgp/archive/2012/05/03/microsoft-dynamics-gp-business-analyzer-part-2.aspx>>, May 3, 2012, p. 1.

Singh, Jivtesh., "Using Gestures with Business Analyzer for Dynamics GP", Retrieved at <<http://community.dynamics.com/product/gp/gptechnical/b/gpjivtesh/archive/2011/08/24/using-gestures-with-business-analyzer-for-dynamics-gp.aspx>>, Aug. 24, 2011, pp. 3.

"Business Analyzer Pro", Retrieved at <<http://www.fintel.us/products/BusinessAnalyzerPro.html>>, Oct. 17, 2008, pp. 6.

"R&R-Business Analyzer", Retrieved at <<http://www.devrieswfm.com/wp-content/uploads/RR-Business-Analyse-V3-UK.pdf>, Retrieved Date : Dec. 27, 2012, pp. 2.

"Mobile Business Analyzer™", Retrieved at <<http://www.epicor.com/Host/Product%20Overview%20-%20Mobile%20Business%20Analyzer.pdf>>, Retrieved Date : Dec. 27, 2012, pp. 2.

"MicoStraegy Launches MicroStategy Web Business Anatyzer", Retrieved at <<http://www.microstrategy.com/about-us/press/release/?ctry=167&id=582>>, Aug. 15, 2000, pp. 2.

\* cited by examiner

BUSINESS SOLUTION USER INTERFACE ENABLING INTERACTION WITH REPORTS

BACKGROUND

Modern business solutions not only connect people inside and outside the organization, they also give them context and insight which drives better decisions and boosts productivity. Thus, enhanced business solution platforms drive connections with people, with customers and with business partners across processes, data and the ecosystem in which organizations operate.

Traditional business solutions target a single workload or entire suites presenting integration challenges as the separate workload solutions rarely come from the same application vendor. The suites naturally deliver integration, but may not support workload-at-a-time implementations. Comprehensive enterprise resource planning (ERP) solutions such as Microsoft Dynamics® by Microsoft Corp. of Redmond, Wash. provide, for example, effective operation and collaboration paths for a variety of business operations. An integrated, efficient business solution aims to enable businesses to operate across locations and countries by standardizing processes, to provide visibility across organizations, and to simplify compliance with regulatory, industry standard, and similar entities.

As computing and networking technologies develop, users get used to newer and more enhanced ways of interaction with computing devices and applications such as various input mechanisms, presentation techniques, and comparable ones. For example, text based user interfaces, while being the norm a couple of decades ago, would not be acceptable to many users. Keyboard/mouse based input is also being replaced with natural input mechanisms such as gesture, eye tracking, voice commands, etc. Conventional business solutions may lack the ability to provide these interaction mechanisms in addition to their shortcomings in providing effective insights into business operations.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a business application user interface providing, among other things, role and entity based reports in an interactable manner for various input mechanisms. Role(s) may be determined automatically or selected from a list of grouped available roles presented in a tiled fashion. Allowing touch, gesture, and other inputs, users may be enabled to select a role, view available reports for the selected role, and view selected reports in detail. Users may also be enabled to set/select configuration parameters through touch/gesture enabled interactions.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a business application user interface may provide role and entity based reports in an interactable manner for various input mechanisms. Role(s) may be determined automatically or selected from a list of grouped available roles presented in a tiled fashion. Allowing touch, gesture, and other inputs, users may be enabled to select a role, view available reports for the selected role, and view selected reports in detail. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing an interactive business solution user interface. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

According to embodiments, a client device enabling user interaction with a business solution (e.g., a hosted service) may be a touch or gesture-enabled device, such that hand gestures and finger touch may be recognized as input methods on the user interface of the client device for interacting with, controlling, and providing content to the client device. The client device may also work with a traditional mouse and keyboard. A touch or gesture-enabled device may recognize touch actions such as a tap, swipe, pinch, expand, and drag, as some examples. Touch actions, such a tap, swipe, pinch, expand, and drag, and other similar actions as used herein may be provided by a user through a finger, a pen, a mouse, or similar device, as well as through predefined keyboard entry combinations, a voice commands, eye tracking, and comparable methods.

Figure 1:
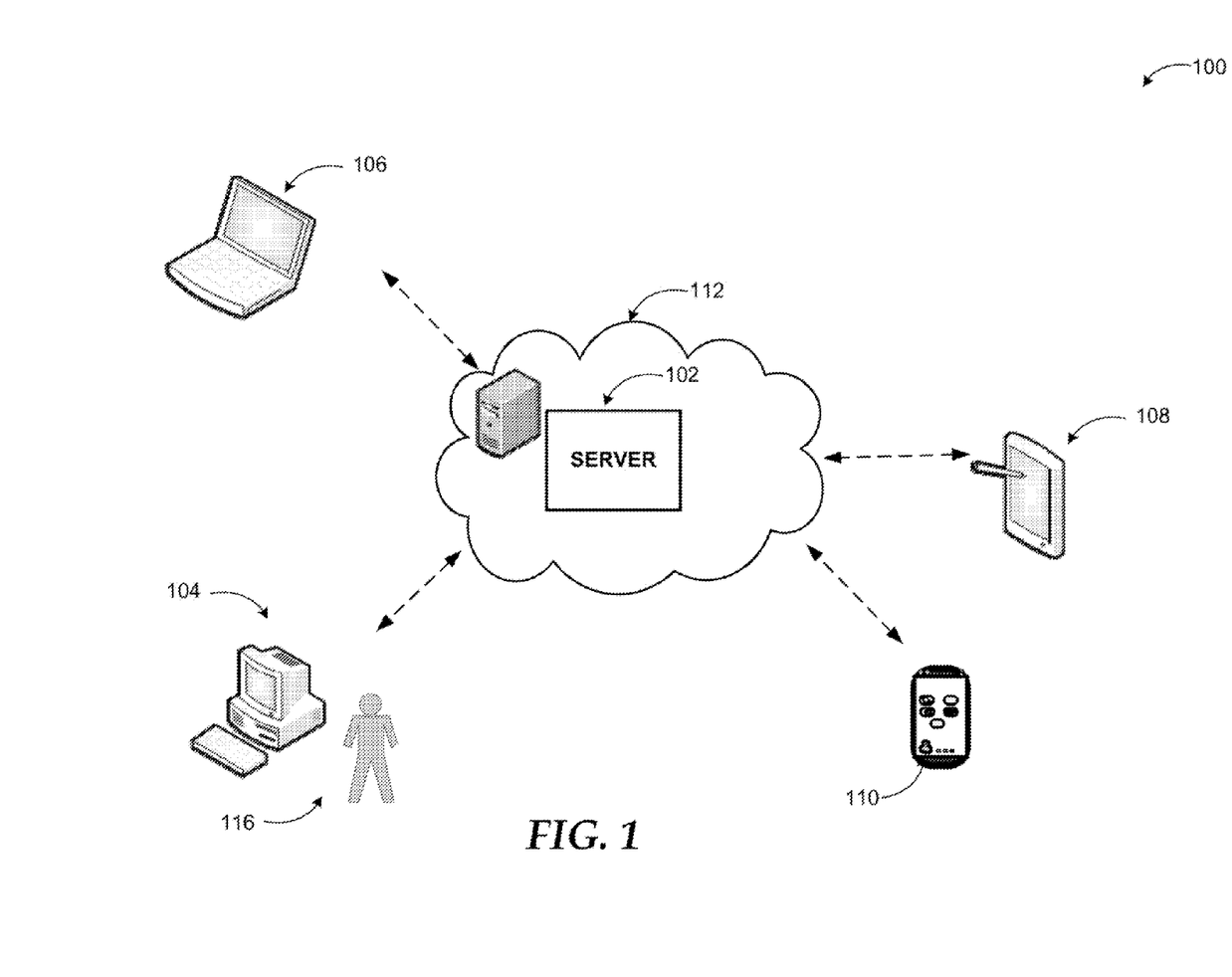
FIG. 1 illustrates an example collaborative business solution environment, where users may be enabled to interact with the business solution through various computing devices.

FIG. 1 illustrates an example collaborative business solution environment, where users may be enabled to interact with the business solution through various computing devices. In a collaborative environment users may access documents and files over a network. Some example documents may be various types of work, business, social, and other interactive and collaborative documents. As illustrated in diagram 100, users may view and interact with a business document such as reports employing a variety of client devices. Some example client devices may include as a desktop computing device 104, a personal computer 106, a tablet 108, a smartphone 110, a whiteboard and other comparable client devices. The client devices may be configured to enable touch and gesture interaction, such that a user 116 may interact with a document viewed on the user's client device employing touch and gesture actions on the user interface of the client device.

In some example embodiments, the client devices may be connected with a server 102 and with other client devices over a network 112, which may be a wired or wireless network, or a cloud network. The user may access over the network 112, a plurality of documents associated with a group with which the user is affiliated, such as a business entity, for example. A business solution platform executed on the server 102 may be accessed through the user's client device and may provide a number of features for enabling the user to interact with documents/reports delivering seamless, efficient, and convenient interactions with documents. The user interface of the business solution may be configured to display documents in a configuration and orientation compatible with the each client device. For example, some client devices, such as a tablet or smart phone, may have a smaller user interface such that viewing multiple documents concurrently may be difficult. The client device may also be configured to enable a user to select a document to occupy a full screen of a document and to navigate and interact with the document employing touch and gestures.

According to some embodiments, a main menu of available options may be presented in ordered tile format, where the users can interact with the tiles by activating them through tapping, changing views through swiping, etc. A hidden pane presenting icons for commands or settings may be brought into view through a swipe or similar action when the main view presents a document, report, or similar content. Furthermore, icons/commands may appear within an application when the user swipes up at the bottom of the application user interface, for example.

A business solution according to some embodiments may increase visibility and improve forward-looking insight at various levels of an organization, providing users with confidence on their decisions. Through an online dashboard, information relevant to a business may be presented in an overview mode and users enabled to drill down to get more detail, create tasks, or delegate to others as needed. Moreover, users may be enabled to make smart decisions with notifications and alerts, automated approval routings and controls, and attach documents to add context to transactions. Such a solution may go beyond basic accounting and financial management with analytics tools that can assist an organization to be more proactive, identify opportunities and problems fast, and take quick action.

For example, reports may be selected based on roles, charts may be presented per role. Selections, configurations may be enabled through a hidden pane that may be brought into view through a quick action such as a swipe allowing more display space for the user interface without having to display setting/configuration commands continuously. Data for reports and other operations may be retrieved from a variety of data sources over one or more networks.

Figure 2:
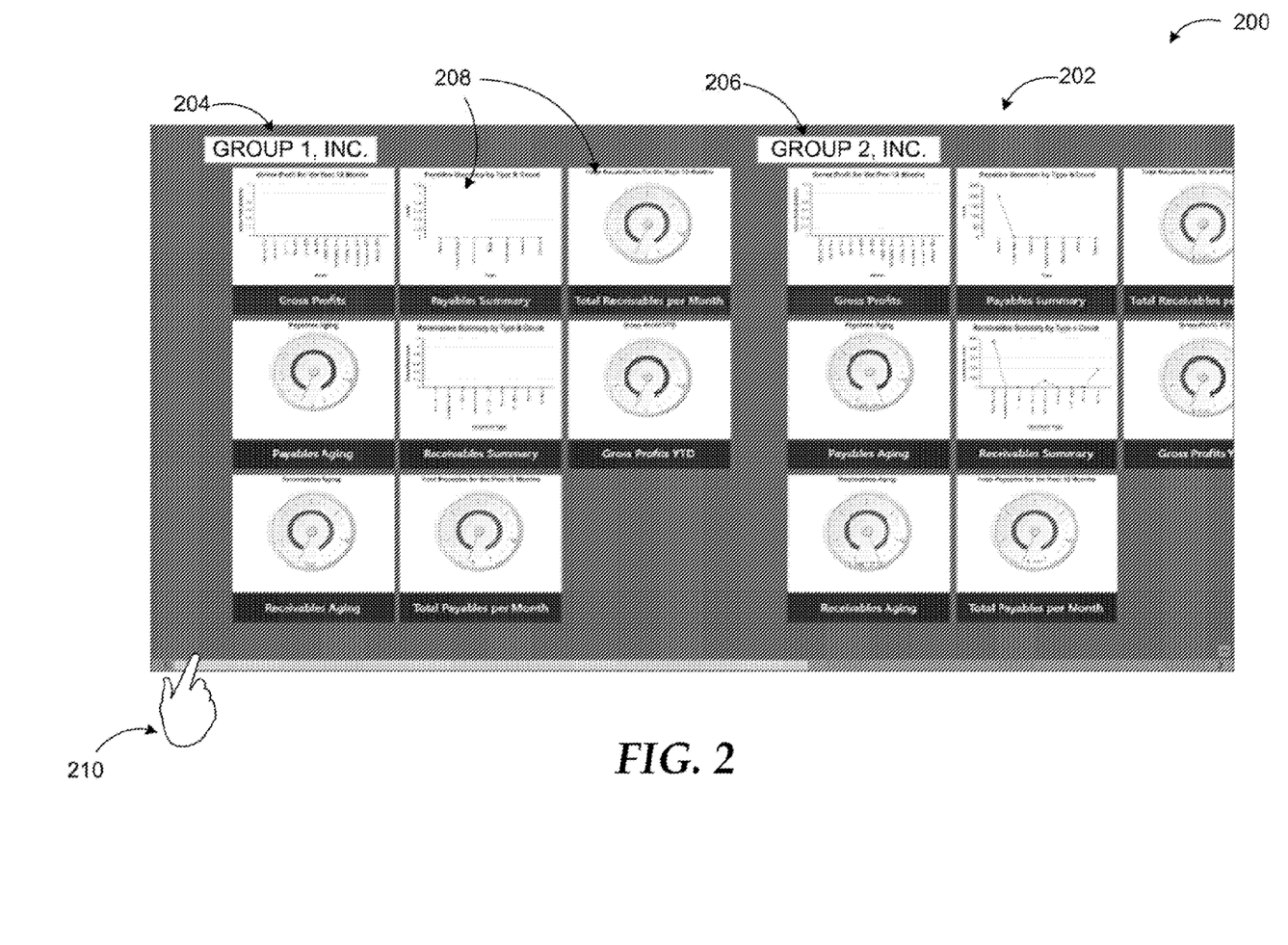
FIG. 2 illustrates an example screenshot of a dashboard view displaying available reports for selection.

FIG. 2 illustrates an example screenshot of a dashboard view displaying available reports for selection, according to some example embodiments. A dashboard view 202 on a business interface, as illustrated in diagram 200, may provide an at-a-glance view of a plurality of reports 208 that the user may be interested in. The reports in the dashboard view 202 may be presented in a reduced size, such as a thumbnail version, for enabling a quick preview of the report contents. In an example scenario, the user may select a number of reports from the server that the user would like to view and interact with on the client device. The dashboard view 202 may enable the user to preview all or a portion of the reports 208 the user has selected to view, and also may enable the user to select a report from the dashboard view 202 to expand the report into a larger version.

In the report selection dashboard view 202, the reports 208 may be presented in groups (204, 206), for example, by companies the users has access to. The user's access may be determined based on their attributes such as their permission to use the solution, their network connection, their operating system credentials, the type of network they use to connect (e.g., public vs. secure), their sign-on credential for a related communication application, or through a sign-on process.

The groups may be listed in alphabetical or other orders. The list of groups (e.g., companies) may also list a multi-group folder if the user has access to the multi-group folder within a business solution web page.

In an example scenario, a list of the folders (series) the user has access to may be visible under each group. The visual indicator for each series may be a tile. Each tile may display the series and the number of reports within the series at the bottom of the tile. The list of tiles may dynamically change based on the group that is selected and the security permission that the user has to the series. The tiles may be displayed in alphabetical order from top to bottom and left to right. Within the folder structure there may be a breakdown of reports, charts, and KPI folders. As in the previous figure, the user may be enabled to interact with the user interface through touch interaction 310 or similar mechanisms.

Figure 3:
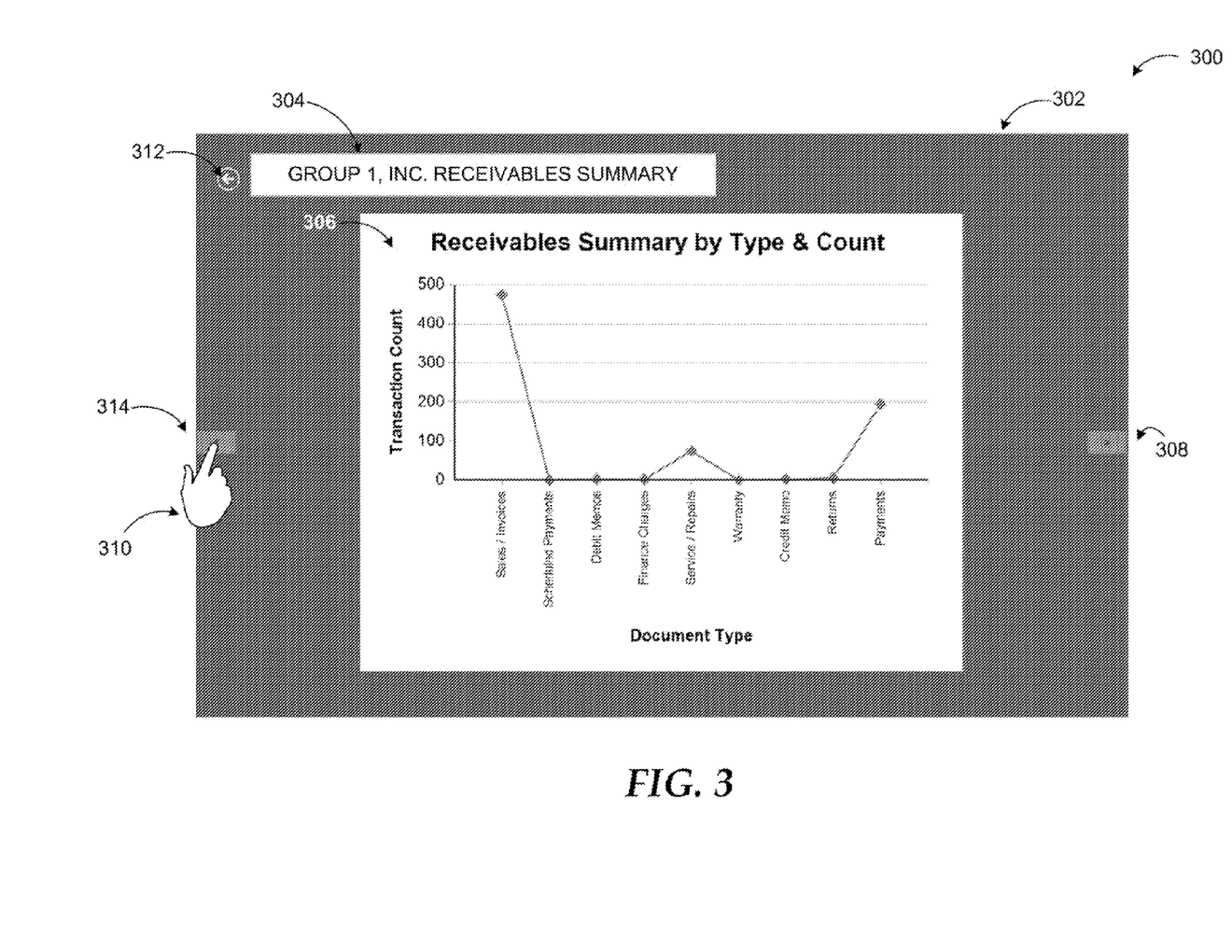
FIG. 3 illustrates an example screenshot of a report on a business solution user interface.

FIG. 3 illustrates an example screenshot of a report on a business solution user interface. As previously described, a user may select a report to view on the client device. Additionally, the user may select from a thumbnail version of a report displayed on a preview menu and displayed on a dashboard view in order to view the report in an expanded view. As illustrated in diagram 300, when a user selects to view a report in an expanded view, the report may be displayed in a full screen view 302 such that the report may occupy a majority of the user interface on the client device. For example, the user may select a report such as a receivables summary 304 from a plurality of reports affiliated with a selected entity, and the receivables summary 304 may be expanded to the full screen view 302.

The user may interact with the full screen version of the document employing touch actions 310, as well as other input mechanisms. The full screen view 302 may present navigation buttons and indicators for enabling the user to interact with the displayed report, as well as navigating to other reports. For example, a back button 312 may be provided for enabling the user to return to a previous menu which may be, for example, a preview of documents affiliated with the selected entity. Other navigation indicators may include forward 308 and backward 314 indicators for enabling the user to navigate forward or backward to display a full screen view of a previous or a next report included in a group of reports affiliated with the selected entity.

Figure 4:
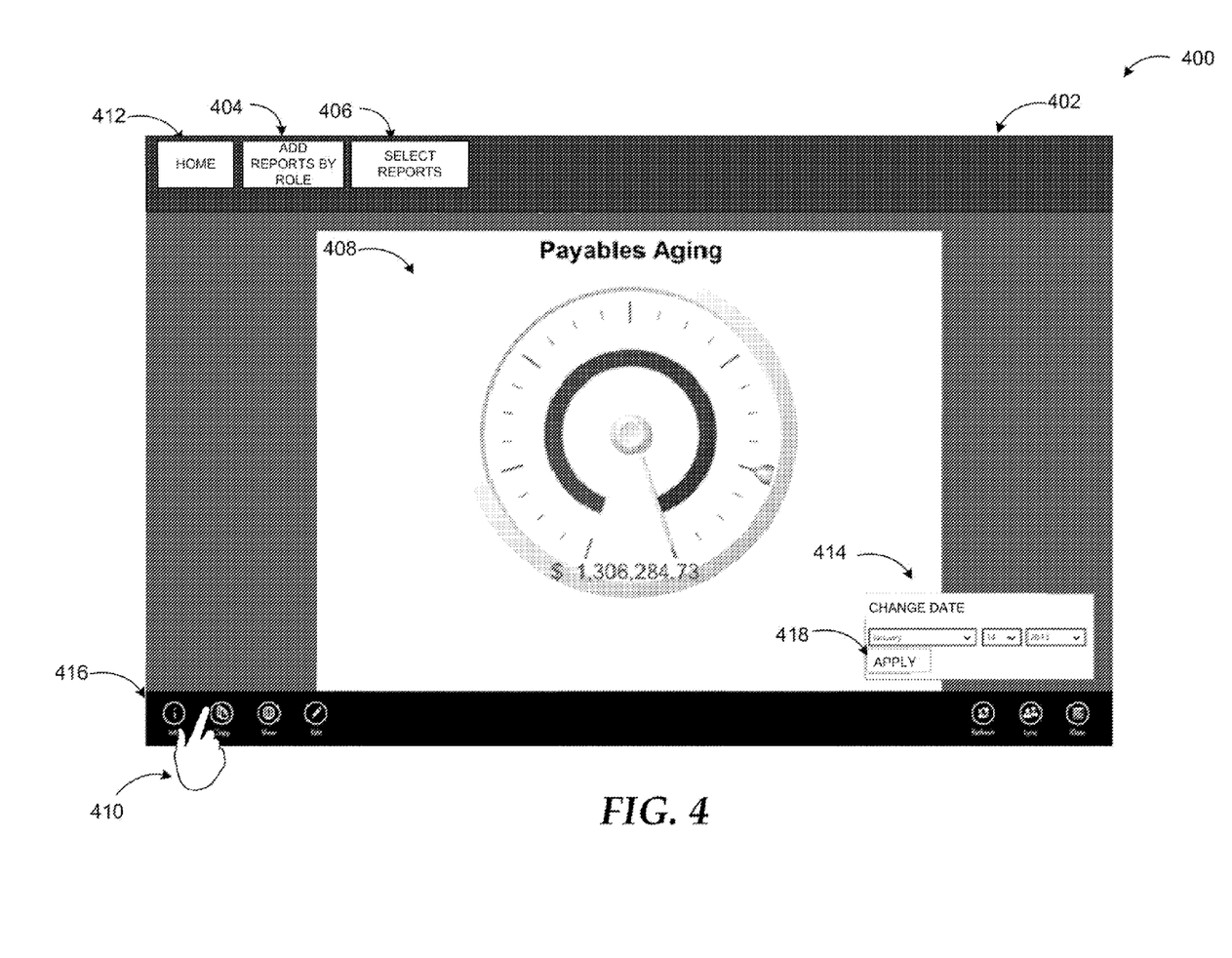
FIG. 4 illustrates an example screenshot of another report on a business solution user interface enabling users to select/change parameters.

FIG. 4 illustrates an example screenshot of another report on a business solution user interface enabling users to select/change parameters, according to some embodiments. As demonstrated in diagram 400, a report may be displayed in a full screen view 402 on the user interface. The interface may provide indicators, buttons, or icons 416 for indicating different actions available for interacting with the displayed report and the user interface. Some example indicators may include an information button which may display additional information about the displayed report, a copy, a view, a refresh, a message icon, an edit, a date, and/or a change company button. These example indicators are not intended to be limiting, but are examples of some indicators that may be displayed to indicate available actions associated with the displayed report.

In an example embodiment, when a user selects an indicator on the user interface, an additional pane or menu presenting available options for interacting with the report may be displayed. For example, when the user selects a date indicator, a calendar pane 414 may be displayed for enabling the user to input information and to adjust a date associated with the report. When the user has finished inputting information and/or adjusting the options presented in the displayed pane, the user may select an apply button 418, the changes the user made in the displayed pane may be applied to the displayed report, and the displayed pane may be minimized or removed.

Additionally, other options may be provided for enabling the user to navigate through reports on the client device. For example, a home button 412 may return the interface to a main screen view displaying a plurality of available reports. Further, an add reports by role button 404 may navigate the interface to a menu for selecting reports based on the entity, group, or role with which the reports are affiliated. Similarly, a select reports button 406 may navigate the interface to a menu for enabling the user to select from a list of available reports located on the client device, and/or located on a server connected with the client device.

Figure 5A:
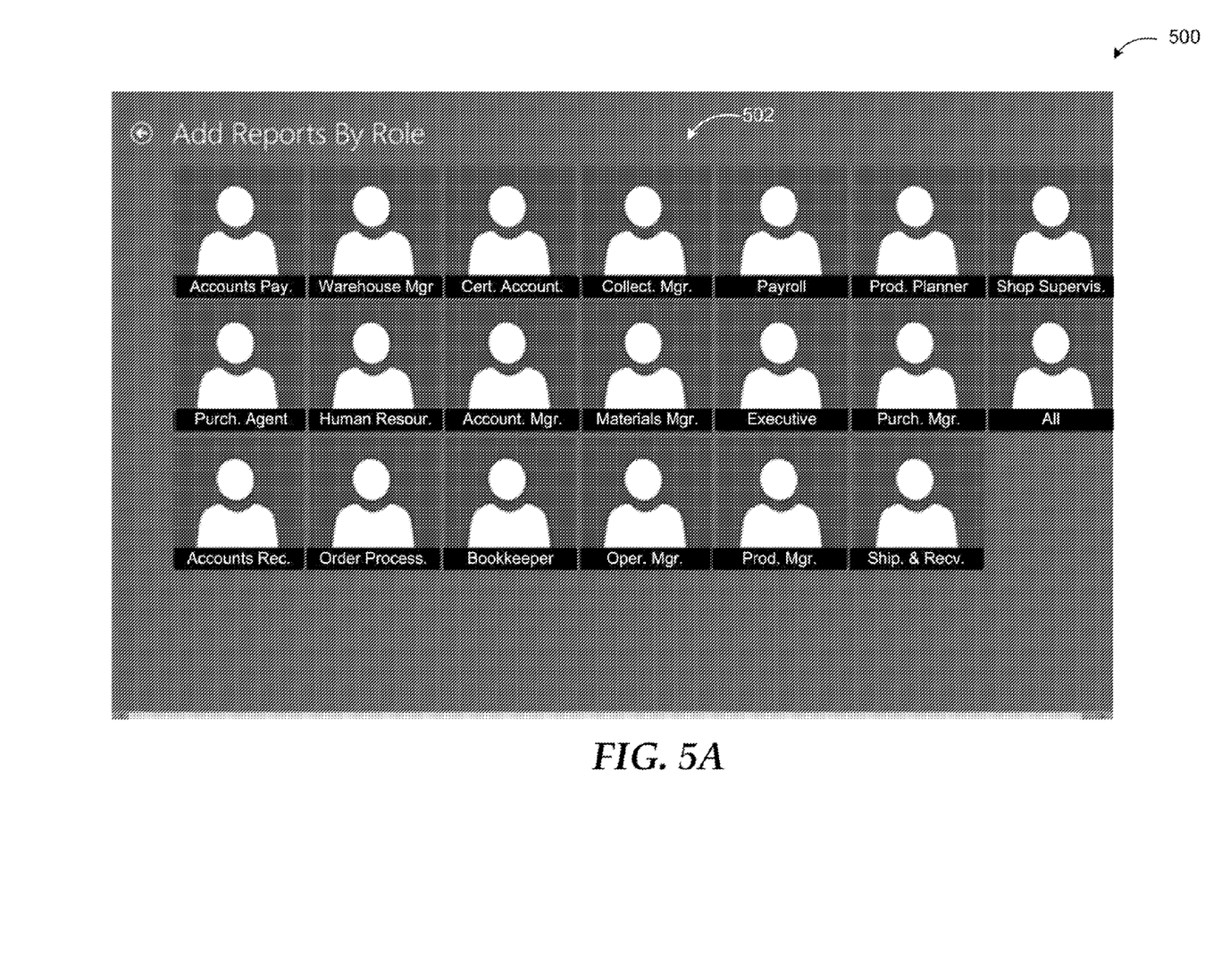
FIGS. 5A and 5B illustrate example screenshots of role based selection of reports to be displayed, executed, or otherwise processed.
Figure 5B:
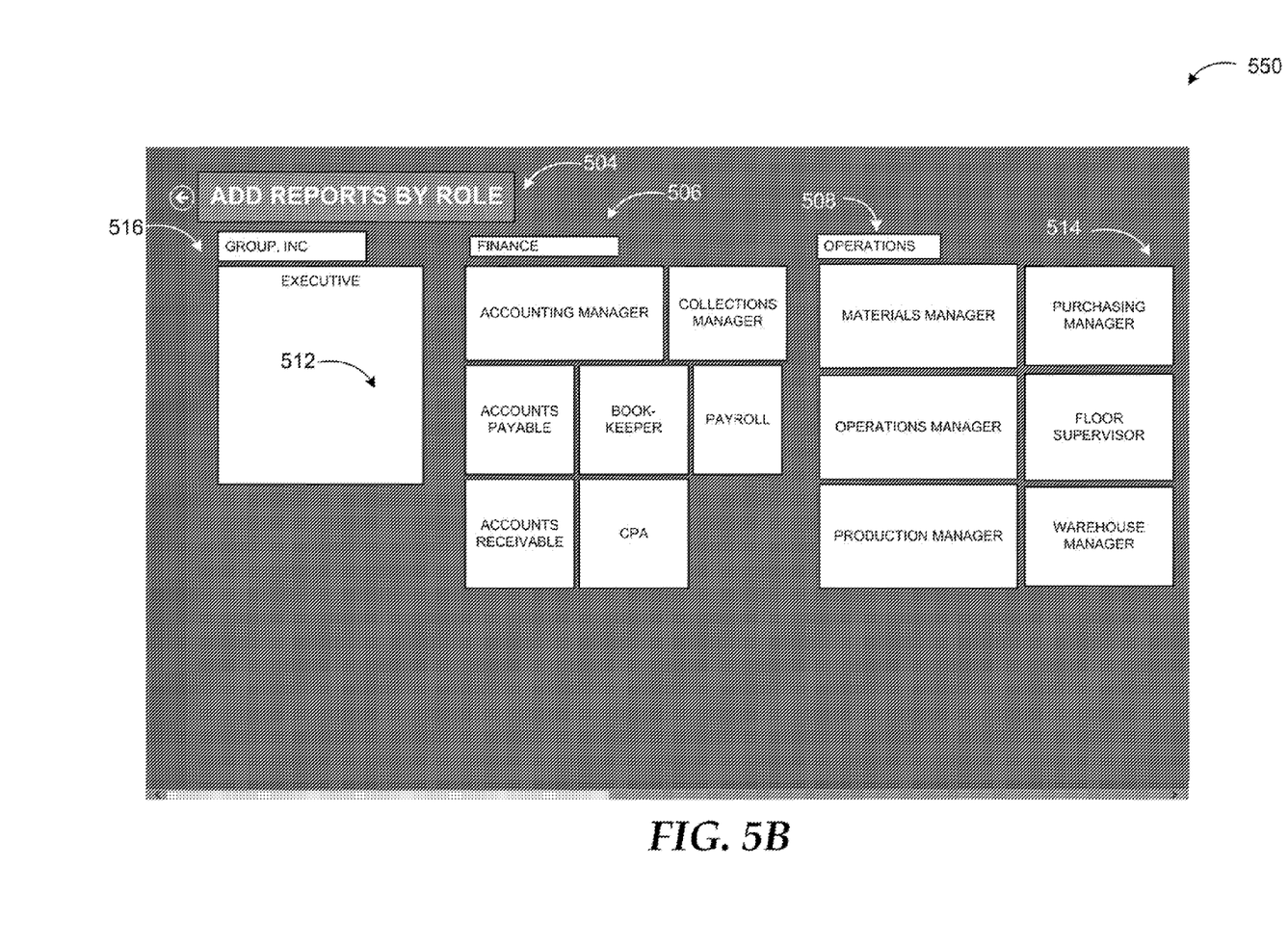

FIGS. 5A and 5B illustrate example screenshots of role based selection of reports to be displayed, executed, or otherwise processed, according to some example embodiments. In some example entity and/or business scenarios, a user may be assigned to a role and/or position. The role of a user may be based on their position or group within the entity. While some roles such as executive may be indicative of a hierarchical position, others may be more general indicative of a department (e.g., shipping & receiving, accounting, etc.).

As shown in diagram 500, a user may be enabled to select among presented roles 502 and reports may be presented for the selected role (or roles). In some embodiments, the reports may be customized for a particular role. In other embodiments, the reports may be grouped based on departments (e.g., purchasing, materials, etc.) and customized or presented based on the user's role within a department such as a purchasing agent vs. a purchasing manager. The user may also be enabled to add or customize reports for a particular role. While in some embodiments the user may be enabled to select one or more roles from the available roles list, in other embodiments, the user's role may be determined automatically from his/her attributes and reports associated with the determined role presented.

In another example embodiment, shown in diagram 550, the user may be enabled to add reports by role (504) by selecting among roles grouped by departments of an organization. In the example screenshot, roles within a company are grouped based on the company's departments. At the top level (company 516), the only role is executive 512. Other departments may include finance 506 with roles such as accounting manager, collections manager, accounts payable, book-keeper, etc., operations 508 with roles such as materials manager, purchasing manager 514, operations manager, floor supervisor, and so on. Upon selection of a role, the business solution user interface may display available reports associated with the selected role. Additionally, the user interface may also include security features in order to ensure that a user has appropriate permissions to view certain reports. For example, the user may provide credentials in order to view reports associated with a particular role, such that even if a user selects to view a role, if the credentials are not verified, protected reports may not be available or displayed.

Figure 6:
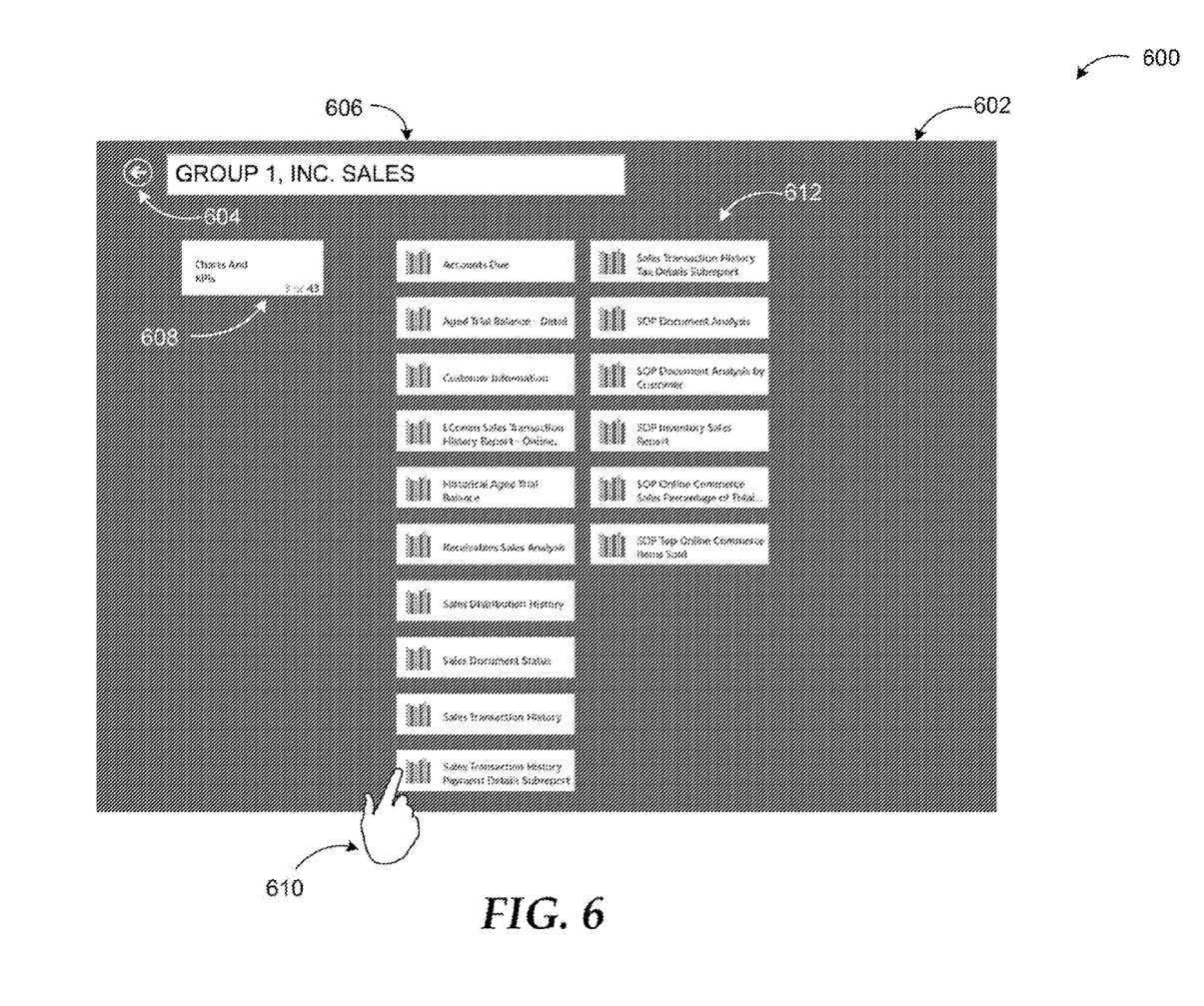
FIG. 6 illustrates an example screenshot of a report selection user interface.

FIG. 6 illustrates an example screenshot of a report selection user interface, according to some example embodiments. As previously discussed, a plurality of reports 612 may be associated with a series 606 within an entity (e.g., a company), and a user may select to view a group of reports based on the series 606. As illustrated in diagram 600, when a user selects to view available reports based on a selected series 606, such as sales, the user interface may display a tiled view or a list of the reports 612 associated with the selected series 606. The user interface may automatically filter the reports based on the series selected, and additionally, the list of reports may be filtered by properties selected by the user. For example, the user may specify a category of reports the user desires to view, such as charts and key performance indicators (KPIs) 608. The user may employ touch actions to select to view a particular report from the displayed list of reports. Additionally, the user interface may include navigational buttons, such as a back button 604 for enabling the user to select to return to a page for selecting a different series, for example.

According to some embodiments, a configuration view may allow the user to define the location of their reporting server. When the configuration option is selected, a fly-out menu may appear with options for a sample report mode. There may also be an on/off toggle. When the toggle switch is "on" the text prompt may be "Add" a report server. This field may be disabled until the user switches the sample report mode to "off". Once a report server has been added the text prompt may show the server location. Sample report mode may be toggled on and off. If sample report mode is turned on, the fields that are populated from the configuration may stay populated but may be disabled again. This information may stay stored so the user can return to live mode without reconfiguring their settings.

The reports within a tile may be navigated to by choosing a left click or comparable input on the tile. When the user left-clicks on the tile, the tile may open and the reports within the tile may be displayed. The report tiles may be selectable. When the user right-clicks or provides a comparable input on the report, that report may be "selected". With touch functionality, the user may be able to touch the report and it may be "selected" to be added to business solution. Multiple reports may also be selectable at folder level. If reports are to be selected at multiple folder levels they may be selected in multiple selections. In the app commands "Apply" and "Select All" icons may be available. The "Apply" button in the app commands may save the selected report(s) to the business solution and make them available to view within a business solution application. If a report/contact is "unselected", the report/contact may be removed or unassigned.

In some examples, the "Select All" button may display on the left hand side of the app commands. Activating this control may select all tiles/reports within the view that is currently displayed. In the upper left hand corner of the report selection view, an option to return to the previous view may be presented by selecting the back arrow. The previous view from this location may be dependent on which view the user was in when they selected the previous view control. If the user was at the company level, the user may be returned to the business solution application view. If the user was at the series level, the user may be returned to the company selection view. If the user is at the report level, the user may be returned to the series selection view. As reports/series are removed from being assigned to the business solution, the reports may have no shading around the report to indicate the report is not assigned to the business solution.

Figure 7:
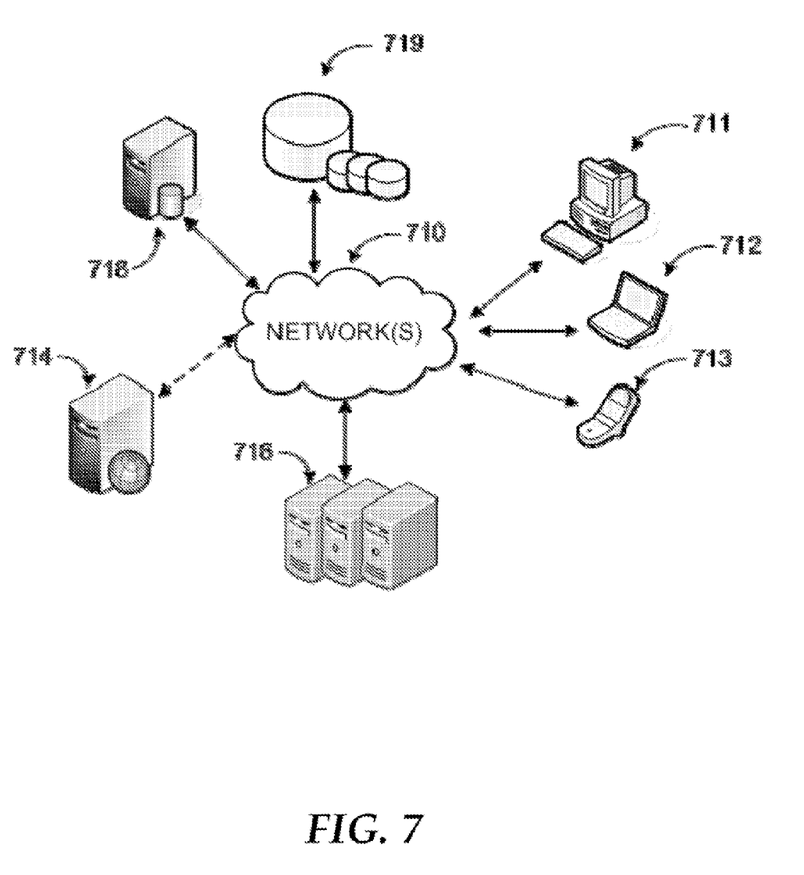
FIG. 7 is a networked environment, where a system according to embodiments may be implemented.

FIG. 7 is an example networked environment, where embodiments may be implemented. A system providing an interactive user interface for interacting with a set of reports associated with an entity on a client device may be implemented via software executed over one or more servers 714 such as a hosted service. The platform may communicate with client applications on individual computing devices such as a smart phone 713, a laptop computer 712, or desktop computer 711 ('client devices') through network(s) 710. Client devices 711-713 are intended as examples. Other examples may include tablets, vehicle mount computers, wearable computers, and similar devices.

Client applications executed on any of the client devices 711-713 may facilitate communications via application(s) executed by servers 714, or on individual server 716. A hosted business solution executed on one or more of the servers may facilitate various business operation related tasks and provide interaction capability to users such as presentation of reports, the ability to set/customize parameters, approve transactions, create documents, and the like. The business solution may also provide role based reports as discussed previously. The application may retrieve relevant data from data store(s) 719 directly or through database server 718, and provide requested services (e.g. document editing) to the user(s) through client devices 711-713.

Network(s) 710 may comprise any topology of servers, clients, Internet service providers, and communication media. A system according to embodiments may have a static or dynamic topology. Network(s) 710 may include secure networks such as an enterprise network, an unsecure network such as a wireless open network, or the Internet. Network(s) 710 may also coordinate communication over other networks such as Public Switched Telephone Network (PSTN) or cellular networks. Furthermore, network(s) 710 may include short range wireless networks such as Bluetooth or similar ones. Network(s) 710 provide communication between the nodes described herein. By way of example, and not limitation, network(s) 710 may include wireless media such as acoustic, RF, infrared and other wireless media.

Many other configurations of computing devices, applications, data sources, and data distribution systems may be employed to implement a platform providing an interactive business solution interface. Furthermore, the networked environments discussed in FIG. 7 are for illustration purposes only. Embodiments are not limited to the example applications, modules, or processes.

Figure 8:
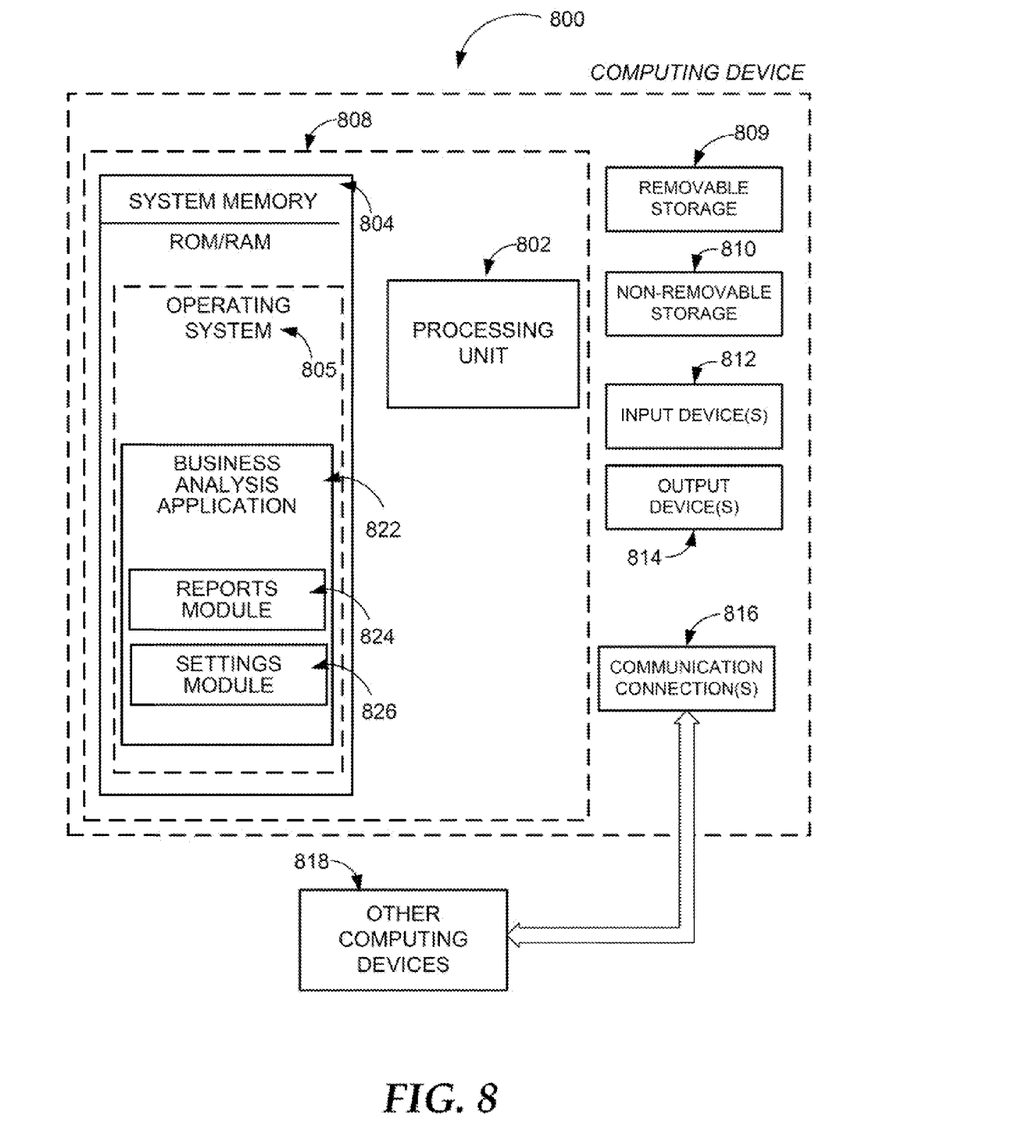
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be any portable computing device with wireless communication capabilities, which may include touch and/or gesture detection capability in some examples, and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 808 suitable for controlling the operation of the platform, such as the WINDOWS®, WINDOWS MOBILE®, or WINDOWS PHONE® operating systems from MICROSOFT CORPORATION of Redmond, Wash. The system memory 804 may also include one or more software applications such as business analysis application 822, reports module 824, and settings module 826.

Business analysis application 822 may enable a user to select a number of reports to view and interact with the application through the user's client device in addition to providing other business related services. Through a reports module 824, business analysis application 822 may identify a plurality of roles defined for an entity and may identify a plurality of reports associated with each role. Upon detection of a selected role by a user, the business analysis application may display a list of reports to the user associated with the selected role. Settings module 826 may enable the user to select configuration parameters for the reports as well as other aspects of the business analysis application operations. Business analysis application 822, reports module 824, and settings module 826 may be separate application or integrated modules of a hosted service. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, an optical capture device for detecting gestures, and comparable input devices. Output device(s) 814 such as a display, speakers, printer, and other types of output devices may also be included. These devices are well known in the art and need not be discussed at length here.

Some embodiments may be implemented in a computing device that includes a communication module, a memory device, and a processor, where the processor executes a method as described above or comparable ones in conjunction with instructions stored in the memory device. Other embodiments may be implemented as a computer readable memory device with instructions stored thereon for executing a method as described above or similar ones. Examples of memory devices as various implementations of hardware are discussed above.

Computing device 800 may also contain communication connections 816 that allow the device to communicate with other devices 818, such as over a wired or wireless network in a distributed computing environment, a satellite link, a cellular link, a short range network, and comparable mechanisms. Other devices 818 may include computer device(s) that execute communication applications, web servers, and comparable devices. Communication connection(s) 816 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
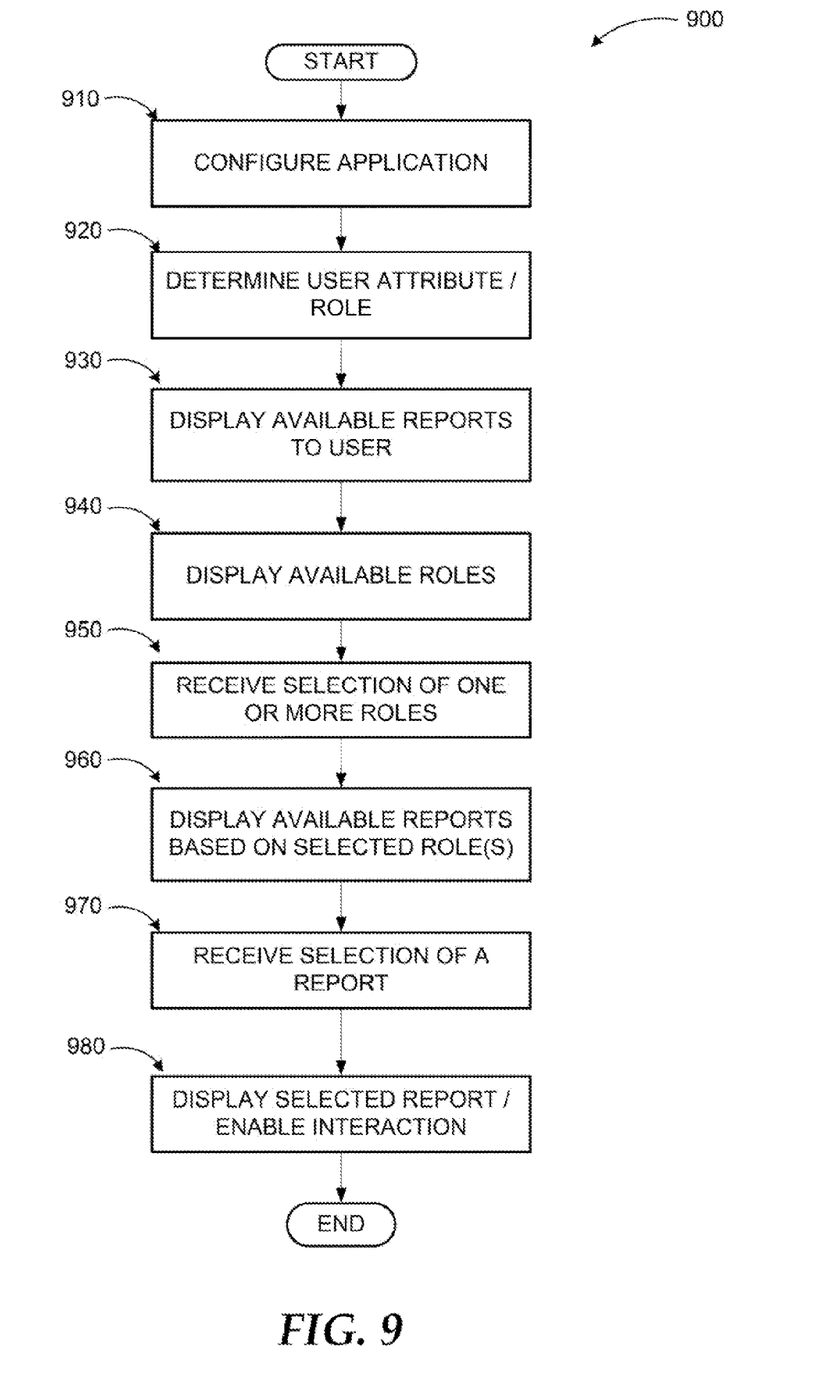
FIG. 9 illustrates a logic flow diagram for a process of providing an interactive business solution user interface according to embodiments.

FIG. 9 illustrates a logic flow diagram for a process of providing an interactive business solution user interface according to embodiments. Process 900 may be implemented on a server or other computing device.

Process 900 begins with operation 910, where a user may be enabled to configure a business application for use with a reporting server by providing a URL to the reporting server, for example. The reporting server may provide the images displayed by the application. At operation 920, a user attribute or role may be determined based on user credentials, user's access network, etc. The user attribute may also be used to determine the user's role. At operation 930, available reports (their summary views or thumbnails) associated with the determined user role may be displayed. The available reports may also be filtered based on the user's permission levels.

At operation 940, a list of available roles for an entity, such as a company may be displayed for user selection. The reports may be presented in a tile format for ease of selection through touch, gesture, or other input mechanisms. A selection of one or more of the roles may be received at operation 950. Upon receipt of the role selection, available reports associated with the selected role(s) may be displayed at operation 960 enabling a user to select and view details of the report.

At operation 970, a selection of a report among the displayed ones may be received and the selected report may be displayed at operation 980 in detail. The user may also be enabled to interact with the business solution modifying report parameters, user parameters, and other configuration settings through controls accessible by various input mechanisms.

The operations included in process 900 are for illustration purposes. Providing an interactive business solution user interface may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed in a computing device for providing a business solution user interface that enables interaction with reports, the method comprising:

identifying attributes of a user, wherein the attributes include two or more of a type of a network used by the user to connect to the business solution, sign-on credentials of the user for a related communication application, and a sign-on process;
determining one or more roles of the user based on the identified attributes;
displaying the one or more roles in a tile format;
upon receiving a selection of the one or more roles, displaying available report representations associated with the selected one or more roles;
upon receiving a selection of one or more of the available report representations, displaying one or more available reports in a full view on the user interface; and
enabling an interaction with the user interface through at least one of a touch input and a gesture input to one or more of: view the displayed one or more available reports, modify the displayed one or more available reports, add one or more new reports, and view additional reports associated with access privileges of the user.

2. The method of claim 1, further comprising:
determining the one or more roles additionally based on one or more of: a user permission associated with using the business solution, a network connection of the user, and operating system credentials of the user.

3. The method of claim 1, further comprising:
displaying the one or more roles in a grouped manner on the user interface based on departments within an organization.

4. The method of claim 1, wherein the one or more roles include roles for individuals and roles for departments.

5. The method of claim 1, wherein displaying the available report representations further includes:
displaying thumbnail views of the one or more available reports.

6. The method of claim 1, further comprising:
displaying the available report representations in a preview menu on the user interface,
wherein the available report representations are displayed as a horizontally scrollable set of tiles below a main view, and
wherein a selected report of the one or more available reports is displayed in the main view while the preview menu is preserved below the main view and the one or more available reports are organized into groups.

7. The method of claim 6, further comprising:
displaying a navigation bar and a location identifier on the navigation bar to move the available reports on the preview menu.

8. The method of claim 6, further comprising:
adjusting an orientation and a size of a selected report of the one or more available reports on the main view to match a size and an orientation of the computing device.

9. The method of claim 1, further comprising:
displaying the one or more roles in a grouped manner based on organizations to which the user has access permission.

* * * * *